May 13, 1947.  D. P. ANDREWS ET AL  2,420,406
PULSATOR-TYPE FLUID MOTOR FOR POWER DRIVEN SAWS
Filed Oct. 12, 1943  3 Sheets-Sheet 1
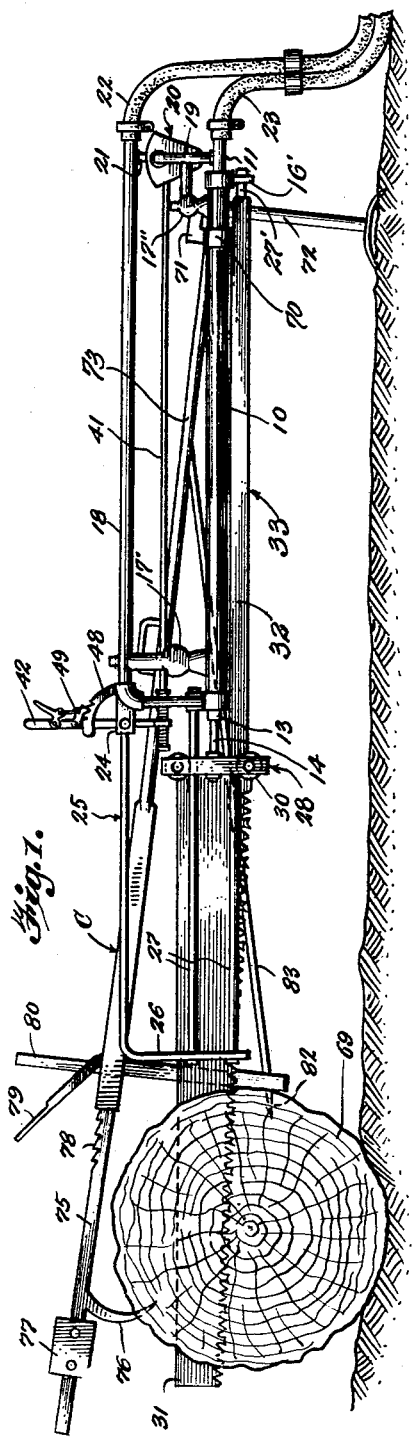
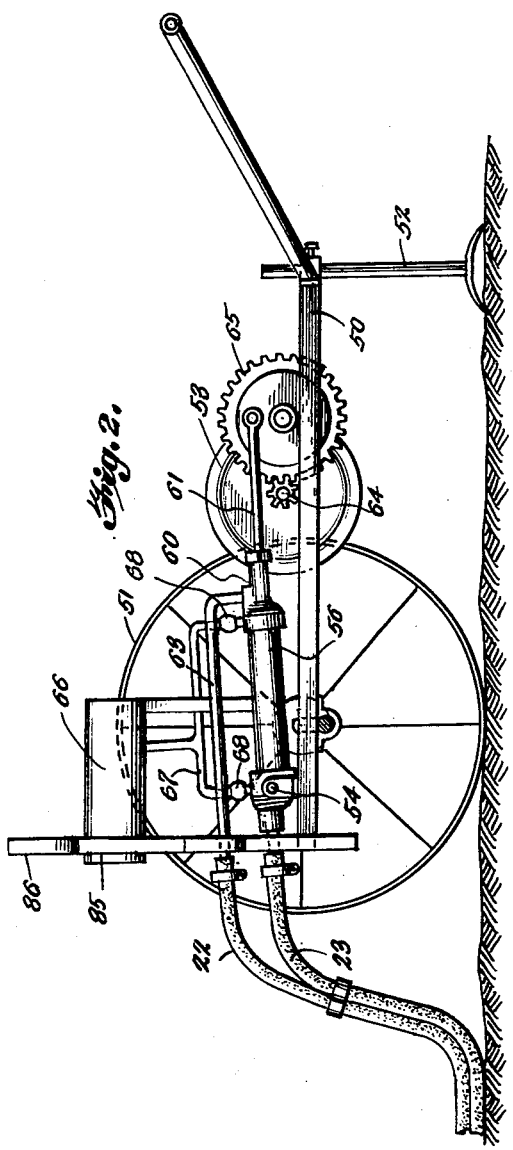
Inventors
DALY P. ANDREWS
BENJAMIN D. HEEGER
ALBERT P. SMITH
By Wilfred E. Lawson
Attorney

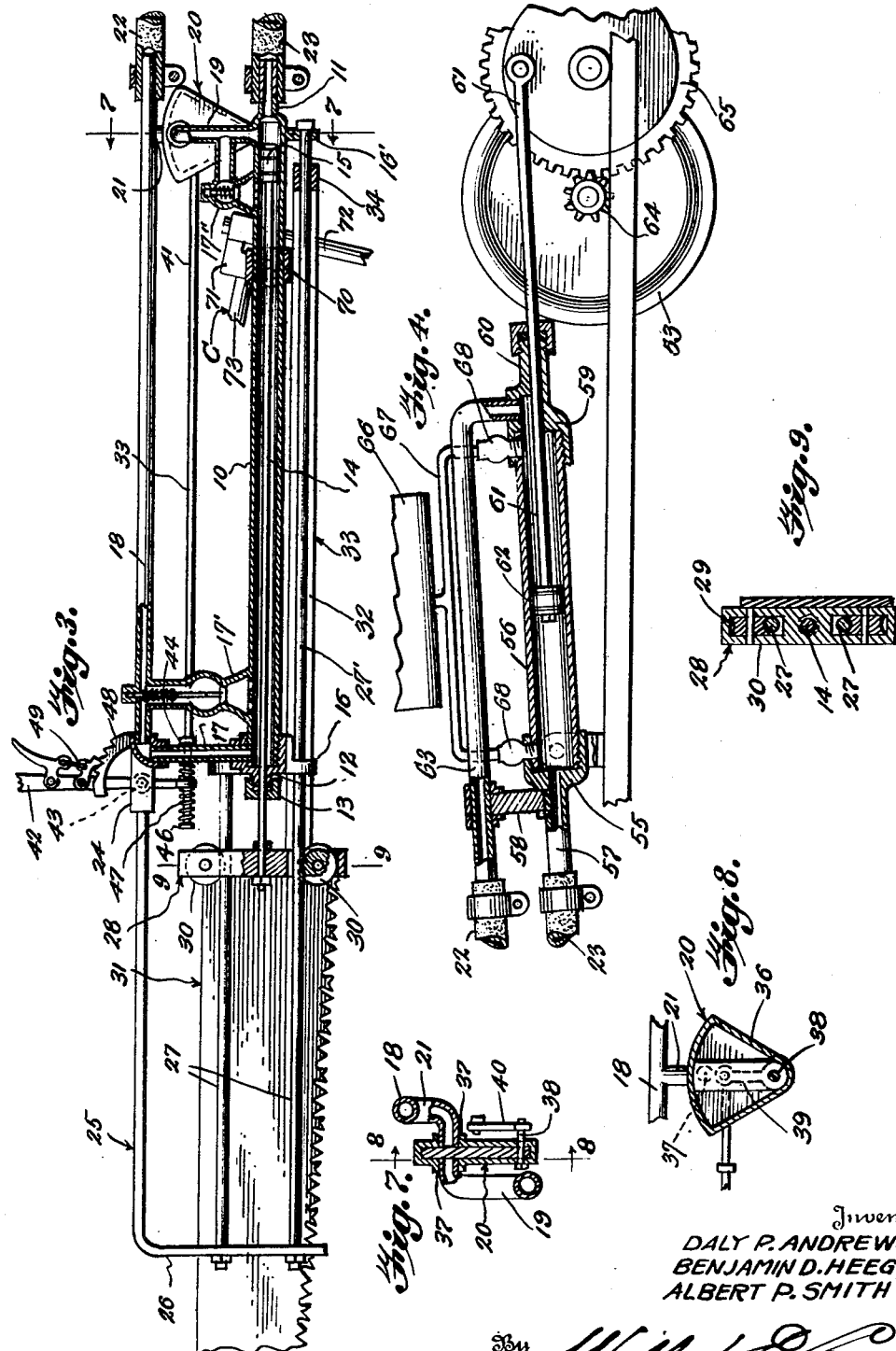

May 13, 1947.  D. P. ANDREWS ET AL  2,420,406
PULSATOR-TYPE FLUID MOTOR FOR POWER DRIVEN SAWS
Filed Oct. 12, 1943  3 Sheets-Sheet 3
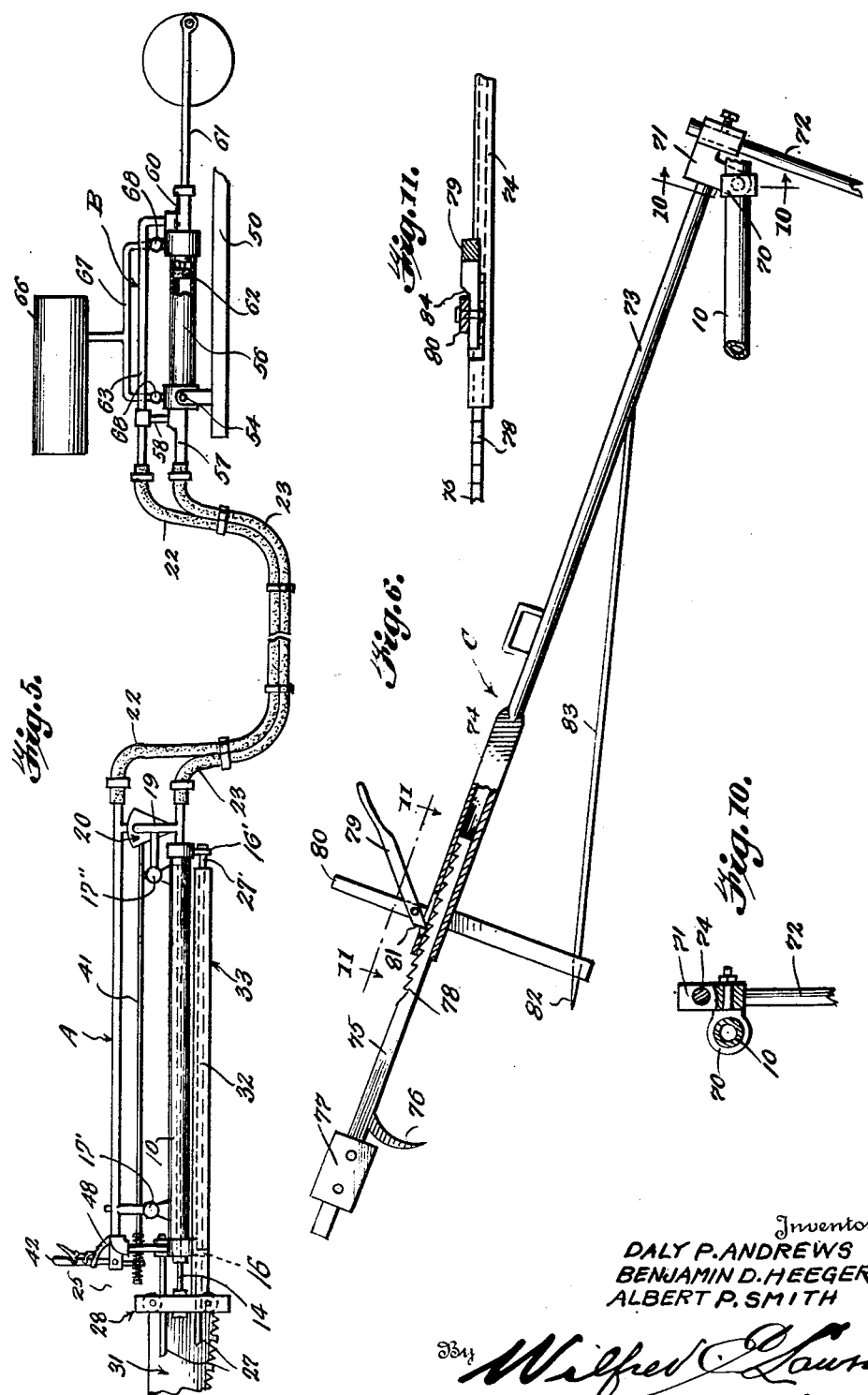
Inventors
DALY P. ANDREWS
BENJAMIN D. HEEGER
ALBERT P. SMITH
By Wilfred C. Lawson
Attorney Patented May 13, 1947

2,420,406

UNITED STATES PATENT OFFICE 2,420,406

PULSATOR-TYPE FLUID MOTOR FOR POWER-DRIVEN SAWS

Daly P. Andrews, Benjamin D. Heeger, and Albert P. Smith, Mountain Grove, Mo.; said Smith assignor to William M. Sanders, Mountain Grove, Mo.

Application October 12, 1943, Serial No. 505,970

1 Claim. (Cl. 60—54.5)

This invention is directed to improvements in power-driven saws and relates particularly to a transportable saw mechanism and means for operating the same.

A principal object of the present invention is to provide a power-driven saw in which the saw is automatically driven by hydraulic power with means automatically controlling or governing the stroke of the saw by relieving application of power thereto, in either of its two directions of movement, after a predetermined extent of movement thereof.

Another object of the invention is to provide in a hydraulically driven saw, a means which functions automatically to reverse the direction of flow of the power fluid to insure accuracy in the strokes of the saw.

Still another object of the invention is to provide a novel reversing valve having means for manual control to bypass the power fluid from a power piston connected with the saw whereby to stop operation of the saw at any time without stopping the fluid moving mechanism of the machine.

Still another object of the invention is to provide a conveniently portable saw unit, which can be readily moved to the sawing job and with the said unit complete in itself and adapted to be connected to any source of power.

Other objects and advantages of the invention will become apparent as the description of the same proceeds and the invention will be best understood from a consideration of the following detailed description taken in connection with the accompanying drawings and with the understanding that minor changes may be made in the invention so long as such changes do not depart from the invention as expressed in the appended claim.

In the drawings:

Figure 1 is a view in side elevation of the saw unit in working position, showing the connections therewith of the flexible hydraulic power conveying means.

Figure 2 is a view in side elevation of the power unit showing the same connected with the fluid hydraulic conveying means, the driving mechanism for the power means being omitted.

Figure 3 is a view on an enlarged scale, partly in longitudinal section and partly in elevation, of parts of the saw unit.

Figure 4 is a view, on an enlarged scale, partly in longitudinal section and partly in elevation, of the power unit, the source of power being omitted.

Figure 5 is a view in elevation and in part diagrammatic, of the saw and power units coupled together.

Figure 6 is a view partly in side elevation and partly in longitudinal section, of a log holding means which is associated with the saw unit.

Figure 7 is a sectional view taken substantially on the line 7—7 of Figure 3.

Figure 8 is a sectional view taken substantially upon the line 8—8 of Figure 7.

Figure 9 is a sectional view taken substantially on the line 9—9 of Figure 3.

Figure 10 is a sectional view taken substantially upon the line 10—10 of Figure 6.

Figure 11 is a sectional view taken substantially upon the line 11—11 of Figure 6.

Referring now more particularly to the drawings, the saw unit and the power unit will be designated respectively A and B, the saw unit having associated therewith as a necessary but separable part thereof, the log holder or clamp which is generally designated C. These units will be described in the order referred to.

The saw unit comprises a saw piston cylinder 10 having upon its rear end a nipple coupling 11 and at its forward end the cap 12 which carries the packing 13 through which slidably extends the rod 14 of a piston 15 which is operated in the cylinder 10.

The cap 12 carries the two opposite ears 16 and the lateral nipple coupling 17 which opens into the forward end of the cylinder 10 and is operatively connected with one end of an auxiliary cylinder 18.

The cylinder 10 at the rear end thereof is connected by the pipe 19 with one side of a shunt valve which is indicated generally by the numeral 20 while the opposite side of this valve is connected by the pipe 21 with the rear end of the auxiliary cylinder 18, such rear end of the auxiliary cylinder being extended beyond the connection 21 to receive one end of a flexible fluid conducting hose 22. The rear end of the rear connecting nipple 11 for the cylinder 10, has connected therewith an end of a fluid conducting hose 23.

At the forward end of the cylinder 10 just rearwardly of the nipple 17 there is connected an outwardly opening check valve 17' which leads from the interior of the cylinder 10 to the interior of the auxiliary cylinder 18 and opens to allow fluid to pass only from the cylinders 10 to the auxiliary cylinder 18.

At the rear end of the cylinder 10 forwardly of the pipe 19 an outwardly opening check valve 17" is connected between the cylinder and the pipe 19 and opens to permit fluid to flow only from the cylinder 10 to the auxiliary cylinder 18 through the pipe 19 and the valve 20.

The two check valves 17' and 17" are so disposed between and with relation to the nipple 17 and pipe 19 that the piston 15 may move beyond the outlet to either of these valves so that its forward movement or its rearward movement will be automatically stopped due to the fact that the propelling fluid will be by-passed through a check valve as soon as the piston passes the same in its movement toward the adjacent end of the cylinder.

Supported from the forward end of the auxiliary cylinder 18 as by means of the bracket-like extension 24, is an end of a forwardly extending frame 25, which frame has a downwardly turned portion 26 which is spaced from and forwardly of the ears 16. This forwardly disposed down turned portion 26 of the frame functions in co-operation with the ears 16, to support the vertically spaced parallel cross-head guide rods 27, the forward ends of which are secured to the frame 25 while the rear end of the upper one is secured to the upper ear 16 and the lower one extends through the lower ear below and spaced from the cylinder, to the rear end thereof where it is supported by the rear ear 16'.

These rods 27 support a travelling cross-head 28 which has spaced openings 29 through which the rods extend and in which are rotatably mounted the peripherally grooved wheels 30, across the adjacent sides of which the rods 27 pass as is clearly shown in Figure 9. Thus the cross-head is supported for back and forth movement upon the guide rod and this back and forth movement is obtained through the connection with the central part of the cross-head, of the forward end of the piston rod 14, as shown in Figure 3.

Secured to the cross-head 28 at one side is the rear end of a saw 31 and there is also connected with the cross-head the forward ends of the horizontally spaced members 32 of a sliding stabilizing frame indicated generally by the numeral 33.

The portion of the lower rod 27 lying between the ears 16 and 16' performs a separate function from the portion lying in advance of the ear 16 and is indicated by the numeral 27'. This portion 27' of the rod 27 forms a guide for the stabilizing frame 33, which frame includes, at its rear end, the sliding collar 34 which circles and slides on the guide 27' as shown in Figure 3.

The shunt valve 20 comprises, as shown most clearly in Figures 7 and 8, a housing or casing 36 through the opposite side walls of which the pipes 19 and 21 open in aligned relation through the ports 37, as shown in Figure 7. Below these ports 37 the casing has extended there-across the rock pin 38 upon which is mounted, within the casing, the oscillating valve plug 39 which, when in center position in the casing, interrupts the flow of fluid between the ports and between the pipes 19 and 21.

One end of the rock pin 38, outside the casing 36, carries the lever 40 to which is attached one end of the horizontally disposed actuating rod 41. This rod extends forwardly beyond the cap 12 of the adjacent cylinder and is slidably extended through the apertured lower end of the control lever 42 which is pivotally mounted as at 43, upon the member 24.

The forward end of the rod 41 has a head 46 and between this head and the stop 44 are two springs 47 between which is located the lower end of the control lever 42.

At one side of the control lever 42 is mounted a rack or toothed segment 48 with which is adjustably engaged the latching finger 49 which is pivotally mounted upon the lever 42. When the lever 42 is in vertical position the valve will be closed but it will be readily seen that by oscillating the lever 42 in either direction the plug may be shifted from its central position as shown in Figure 8, so as to uncover the aligned ports 37 and therefore the operating fluid entering either by the tube 22 or the tube 23, will be by-passed or shunted to the opposite tube away from the cylinders 10 and 18 so that no power will be applied to the piston 15 and the saw will remain idle even though the here-in-after described mechanism by which the power fluid is pumped, may be continued in operation.

The power unit B is particularly illustrated in Figures 2 and 4. This comprises a frame 50 mounted upon supporting wheels 51 located at one end of the frame while at the other end a suitable vertically adjustable supporting leg 52 is connected. This frame may be used, by suitably enlarging its proportions, for the support of an internal combustion engine or other suitable source of power for operating the power unit or the power unit may be coupled with a suitable remote source of power. No power source is here illustrated, there being shown only a pulley wheel 53 to receive power from the selected source and transmitted to the power piston.

Upon the frame 50 is mounted a rock bearing 54 in which is mounted for rocking movement the coupling 55 which forms one head of a power piston cylinder 56 and which has connected therewith the axial nipple 57 and the lateral post 58. The coupling nipple 57 has connected therewith the other end of the hose 23. At the other end of the power cylinder 56 is the coupling 59 which is axially extended at 60 to form a guide for a piston rod 61 which extends into the cylinder to the piston 62.

Adjacent the power cylinder 56 is an auxiliary cylinder 63 which is connected at one end with the coupling 59 as shown for communication with the interior of the cylinder 56 while at its other it is connected by means of the post 58 with the forward end of this cylinder and beyond the post 58 it has connected therewith the other end of the tube or hose 22.

A driving connection is provided between the pulley 53 and the rear end of the piston rod 61, here shown as a pinion 64 connected with the pulley and a gear 65 operatively coupled with the pinion and with which the end of the piston rod is eccentrically connected.

The piston cylinder, upon both sides of the pistons and the pipes and auxiliary cylinders are filled with the suitable power transmitting fluid and in order that this fluid may be replenished from time to time, as may be necessary, there is mounted upon the frame 50 a supply tank 66. This supply tank has connected therewith the two oppositely directed outlet branch pipes 67 each of which connects, through a check valve 68, with one end of the power units piston cylinder 56 as is clearly shown in Figure 4. These check valves open towards the cylinder 56 so that if the volume of fluid in the system decreases for any reason a sufficient amount will be admitted through one of these check valves to make up the deficit and thus the system will be kept filled at all times.

In order to secure and hold steady a log, as shown in Figure 1 and indicated by the numeral 69, while it is being sawed, there is provided the holding means or clamp C, shown particularly in Figure 6.

The clamp C is secured by suitable means such as the collar 70 which may be mounted upon the saw unit cylinder 10. This connection includes a sleeved body 71 with which is adjustably connected the upper end of a supporting leg or ground engaging spur 72. This leg 72 provides a desirable support for the saw unit and for the log clamp.

The log clamp includes an arm 73 secured at one end of the body 71 and formed at its opposite end to provide the tubular guide 74 which is open at its forward end. Slidably extended into this tubular guide 74 is a hook bar 75 which carries a hook or spur 76, and, beyond the spur, an adjustable weight 77.

The hook bar 75 has in its top edge a plurality of teeth 78 which are designed to be engaged by the pointed end of a locking or securing lever 79, which is pivotally mounted upon an arm 80 which is secured to the tubular portion 74 of the bar. The pointed end of the lever 79 extends through a suitable opening 81 in the tubular extension 74 for engagement with one of the teeth 78.

The arm 80 extends below as well as above the tubular portion of the bar 73 and at its lower end it has suitably extended therethrough or otherwise secured thereto the pointed forward end 82 of a rod 83 which is secured at its other end to the bar 73 and extends therefrom in oblique relation therewith. The pointed end of this rod 83 is located below and spaced behind the spur 76 so that it may be engaged in the side of a log and the spurred or hooked bar 75 extended across the top of the log and engaged therewith upon the opposite side from the point 82 as shown in Figure 1.

In the operation of the present apparatus the saw clamp is applied by engaging the point of the lower holding rod 83 in the side of the log 69 and moving the spur-bar 75 back until the spur 76 engages in the top part of the log at the opposite side from the bar 83. During this adjustment the securing lever 79 for the clamp will be thrown over to the position shown in Figure 6. After the spur has been brought into engagement with the log, the lever 79 is then swung over to the opposite side so that the point of the lever will engage a tooth 78 and pull the spur 76 firmly into the wood.

The lever 79 will be frictionally held in its final position by the means illustrated in Figure 11 which comprises a camming or wedging face 84 formed in the side of the lever 79 nearest the arm 80 so that when the lever is thrown over this cam face will wedge against the adjacent face of the arm and tightly frictionally engage the lever and arm together so that the two parts will not be jarred loose by vibration.

Because of the pivotal connection between the saw unit and the clamping unit as shown in Figure 10 it will be seen that the sawing unit can be raised and lowered independently of the clamping unit after the latter has been firmly attached to the log so that the toothed edge of the saw can engage across the top of the log at the start of the sawing operation.

When the power unit B is set in operation the power piston 62 will force the fluid alternately back and forth through the pipes and auxiliary cylinders so as to cause a corresponding back and forth movement of the saw unit piston or driven piston 15 to effect the reciprocation of the saw. For example, if the power piston 62 initially moves forward the fluid will be forced through the hose 23 into the rear end of the saw unit cylinder 10 to force the piston 15 forwardly. The fluid ahead of the piston 15 will move back through the auxiliary cylinder 18, the hose 22 and the rear auxiliary cylinder 63 into the rear end of the power cylinder 56. When the power piston 62 reaches the limit of its forward movement and starts to reverse, the movement of the fluid in the system will likewise reverse, the power or pressure now being applied to the forward side of the saw unit piston 15 and the rear side of the power unit 62, the fluid under pressure now flowing forwardly through the hose 22 to the forward end of the saw unit cylinder.

If, at the beginning of the forward stroke of the power piston 62, the saw piston 15 should be too far forward in the cylinder 10 it will be seen that, if some means were not provided for effecting compensation of movement between the pistons, the piston 15 would reach the forward end of the cylinder before the piston 62 had finished its stroke forwardly and consequently rupture of the conduit or conduits between these cylinders might occur or some other damage be done. By providing the relief check valves 17' and 17" the necessary adjustment is made of the forward piston so that the two pistons will operate in proper time. As will be readily apparent when the forward piston reaches the end of its forward stroke it will have passed the point of connection between the forward end of the cylinder 10 and the relief check valve 17' and consequently the pressure of fluid will be relieved by passing through this check valve which forms a shunt to the auxiliary cylinder 18. Therefore the power piston 62 can continue to move forward until the inner end of its stroke is reached, even though the piston 15 may have previously reached the limit of its forward movement and is stationary.

Upon reversal of movement of the power piston 62 the movement of fluid in the piston will, of course, be reversed and the fluid will then be introduced into the forward end of the cylinder 10 behind the piston 15 so as to force it back to the rear end of this cylinder and if any further adjustments should be necessary with regard to the movement of this piston with respect to the power piston, it will be seen that after the piston 15 passes the port of communication between the cylinder 10 and the relief check valve 17", the fluid will be shunted through this check valve into the pipe 19 and will return through the tube 23 to the forward end of the power unit cylinder 56. It is to be noted that the space between the relief check valve 17' and the adjacent nipple 17 and also the space between the relief check valve 17" and the pipe 19, where these parts communicate with the interior of the cylinder 10, is such that the movement of the piston 15 will be stopped by the shunting of the power fluid before the piston 15 has moved to a position where it will close either the adjacent end of the nipple 17 or the adjacent end of the pipe 19. Thus the blocking of these pipes by the piston is avoided.

It will be understood that during the continued operation of the machine the valve 20 will be closed. If it should be desired to stop the operation of the saw at any time, without having to stop the operation of the pumping unit this may be accomplished by opening the valve 20 whereupon the fluid will be shunted across between the rear end of the cylinder 10 and the adjacent end of the auxiliary cylinder 18.

It will be understood that while the power unit or hydraulic pressure developing mechanism has been shown and described as being carried upon a wheeled frame it may be independently mounted at any suitable distance from the saw unit, the hose connections 22 and 23 being of any appropriate length to permit such operation and permit extreme flexibility with regard to the relative positions of the saw unit and the power unit.

Provision may be made for supporting the saw unit upon the wheel frame structure upon which the power means is mounted by the provision of a supporting standard 85 which may be provided with an upwardly opening U saddle 86 in which the frame 25 of the saw unit can be hooked so as to support the saw unit upon the wheel frame.

It will be apparent from the foregoing that the sewing apparatus herein disclosed provides means whereby logs may be readily sawed without having to be transported from the position where they were felled and that the apparatus is of a very flexible character in that the power means may be operated from automobile engine, a tractor or an engine mounted directly upon the frame on which the power unit is mounted. When the apparatus is to be moved to another location the saw unit after being disconnected from the log, may be readily mounted on the wheeled frame by the use of the supporting bracket 85, and the entire mechanism is shifted to the desired new location.

We claim:

A fluid power motor, comprising a piston cylinder, a piston therein having a rod extending from one end, a fluid admission and discharge port at each end of the cylinder, an outwardly opening check valve in communication with and leading from each end of the cylinder at a point inwardly from the adjacent port a distance at least as great as the length of the piston in the cylinder whereby the piston may position between either port and the adjacent check valve, an auxiliary cylinder paralleling the first cylinder and having one end in open connection with one port and having its other end adapted to receive and discharge power fluid, one of said check valves being connected between the cylinders adjacent to the said one end of the auxiliary cylinder, a fluid shunt line connected between the auxiliary cylinder at its other end and the port in the adjacent end of the first cylinder, a closed valve in the shunt line, the other check valve being coupled with the shunt line between the valve in the shunt line and the adjacent port, means for coupling the piston rod with a body to be actuated thereby, a pair of spaced bars extending longitudinally of the piston cylinder, a cross head slidable upon the bars, the piston rod also being attached to the cross head, an actuating rod connected with the shunt line valve and positioned in the path of movement of the cross head with an end disposed to be engaged by the cross head upon movement of the cross head beyond a predetermined position in one direction to effect the opening of the shunt line valve, and spring means operatively coupled with said rod and normally urging movement of the rod in a direction to close the shunt line valve.

DALY P. ANDREWS.
BENJAMIN D. HEEGER.
ALBERT P. SMITH.

REFERENCES CITED

The following references are of record in the file of this patent:

UNITED STATES PATENTS

| Number | Name | Date |
|---|---|---|
| 2,162,748 | Richards et al. | June 20, 1939 |
| 925,553 | Barker | June 22, 1909 |
| 17,601 | Wilmot et al. | June 16, 1857 |
| 670,447 | Fulton | Mar. 26, 1901 |
| 893,393 | Smith | July 14, 1903 |
| 1,450,357 | Curtis | Apr. 3, 1923 |
| 1,854,111 | Curtis | Apr. 12, 1932 |
| 2,114,241 | Tosten | Apr. 12, 1938 |